US011982128B2

(12) United States Patent
Liu

(10) Patent No.: US 11,982,128 B2
(45) Date of Patent: May 14, 2024

(54) SHELF AND LADDER COMBINATION

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 1211 days.

(21) Appl. No.: 16/689,515

(22) Filed: Nov. 20, 2019

(65) Prior Publication Data

US 2020/0362634 A1 Nov. 19, 2020

(30) Foreign Application Priority Data

May 14, 2019 (CN) ......................... 201920683397.7

(51) Int. Cl.
*E06C 9/12* (2006.01)

(52) U.S. Cl.
CPC ..................................... *E06C 9/12* (2013.01)

(58) Field of Classification Search
CPC ..... E06C 9/12; E06C 1/06; E06C 9/06; E06C 1/397; E06C 7/06; E06C 7/505; E06C 1/36; E06C 1/34; A47F 5/116
See application file for complete search history.

(56) References Cited

U.S. PATENT DOCUMENTS

| | | | | |
|---|---|---|---|---|
| 274,855 A * | 3/1883 | Treftz | ........................ E06C 9/12 | 182/214 |
| 508,099 A * | 11/1893 | Fisher | ........................ E06C 9/12 | 182/39 |
| 755,499 A * | 3/1904 | Lane | .................... A47B 61/003 | 248/300 |
| 8,443,992 B2 * | 5/2013 | Lawson | ............... A47B 47/028 | 211/187 |

FOREIGN PATENT DOCUMENTS

KR 20110139346 A * 12/2011 ............. E06C 1/397

* cited by examiner

*Primary Examiner* — Brian D Mattei
*Assistant Examiner* — Jacob G Sweeney
(74) *Attorney, Agent, or Firm* — Burris Law, PLLC

(57) ABSTRACT

A shelf and ladder combination includes two support rod units, partition plates connected between the support rod units, a cross bar, two main connecting brackets connecting the cross bar to the support rod units, and a ladder unit. The ladder unit includes two ladder legs, at least one fixing unit, and a plurality of rungs connected between the ladder legs. Each ladder leg has a first end portion adjacent to the crossbar, and a second end portion opposite to the first end portion. The at least one fixing unit is sleeved on the crossbar, is slidable along the crossbar, and is connected to the first end portion of one of the ladder legs.

6 Claims, 6 Drawing Sheets

SHELF AND LADDER COMBINATION

CROSS-REFERENCE TO RELATED APPLICATION

This application claims priority of Chinese Application No. 201920683397.7, filed on May 14, 2019.

FIELD

The disclosure relates to a storage equipment, more particularly to a shelf and ladder combination.

BACKGROUND

Referring to FIG. 1, a conventional shelf unit 11 disposed in a factory is heightened to increase the storage space thereof. In order to place or take an object 12 to or from a high location of the shelf unit 11, a user must use an existing shelf ladder 13.

However, the shelf ladder 13 is large and occupies most of the aisle space, so that the minimum distance between each row of the shelve units 11 is limited. Thus, it is difficult to effectively utilize the space in the factory for storing objects 12.

SUMMARY

Therefore, an object of the present disclosure is to provide a shelf and ladder combination that can facilitate placing or taking of objects and that can save occupying space.

Accordingly, a shelf and ladder combination of this disclosure includes a shelf unit and a ladder unit.

The shelf unit includes a frame and a positioning unit. The frame includes two support rod units each of which extends in a first direction, and a plurality of partition plates each of which extends in a second direction transverse to the first direction. The support rod units are spaced apart from each other in the second direction. Each support rod unit has a top end portion and a bottom end portion opposite to each other in the first direction. The partition plates are connected between the support rod units and are spaced apart from each other in the first direction. The positioning unit includes a crossbar that extends in the second direction, that is spaced apart from the frame in a third direction transverse to the first and second directions and that is proximate to the top end portions of the support rod units, and two main connecting brackets each of which is connected between the crossbar and the top end portion of a corresponding one of the support rod units.

The ladder unit includes two ladder legs extending in the first direction and spaced apart from each other in the second direction, at least one fixing unit that is connected to one of the ladder legs, that is sleeved on the crossbar and that is slidable along the crossbar in the second direction, and a plurality of rungs connected between the ladder legs and spaced apart from each other in the first direction. Each ladder leg has a first end portion adjacent to the crossbar, and a second end portion opposite to the first end portion in the first direction. The at least one fixing unit is connected to the first end portion of one of the ladder legs.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
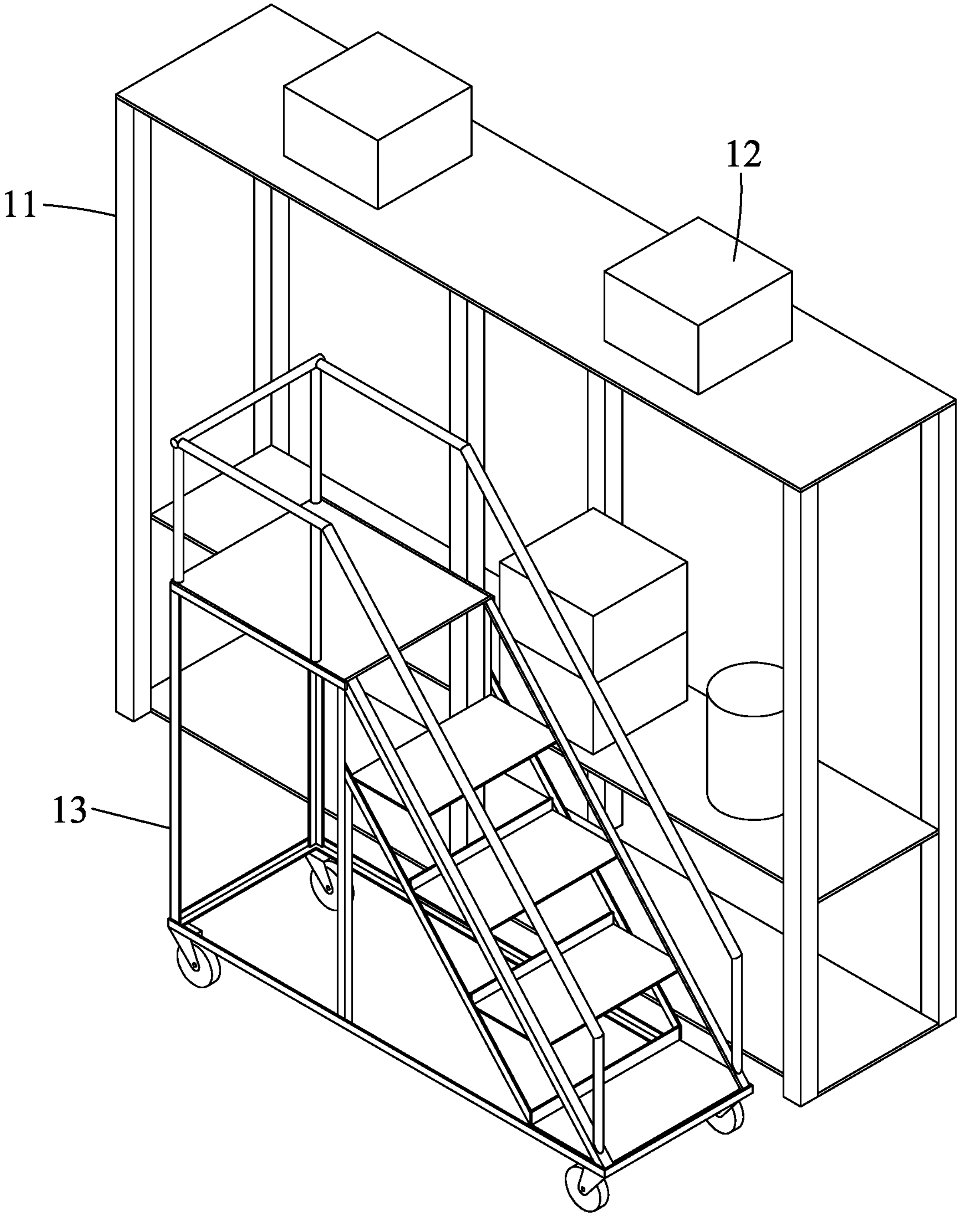
FIG.1 PRIOR ART
FIG. 1 is a perspective view of a conventional shelf unit.
Figure 2:
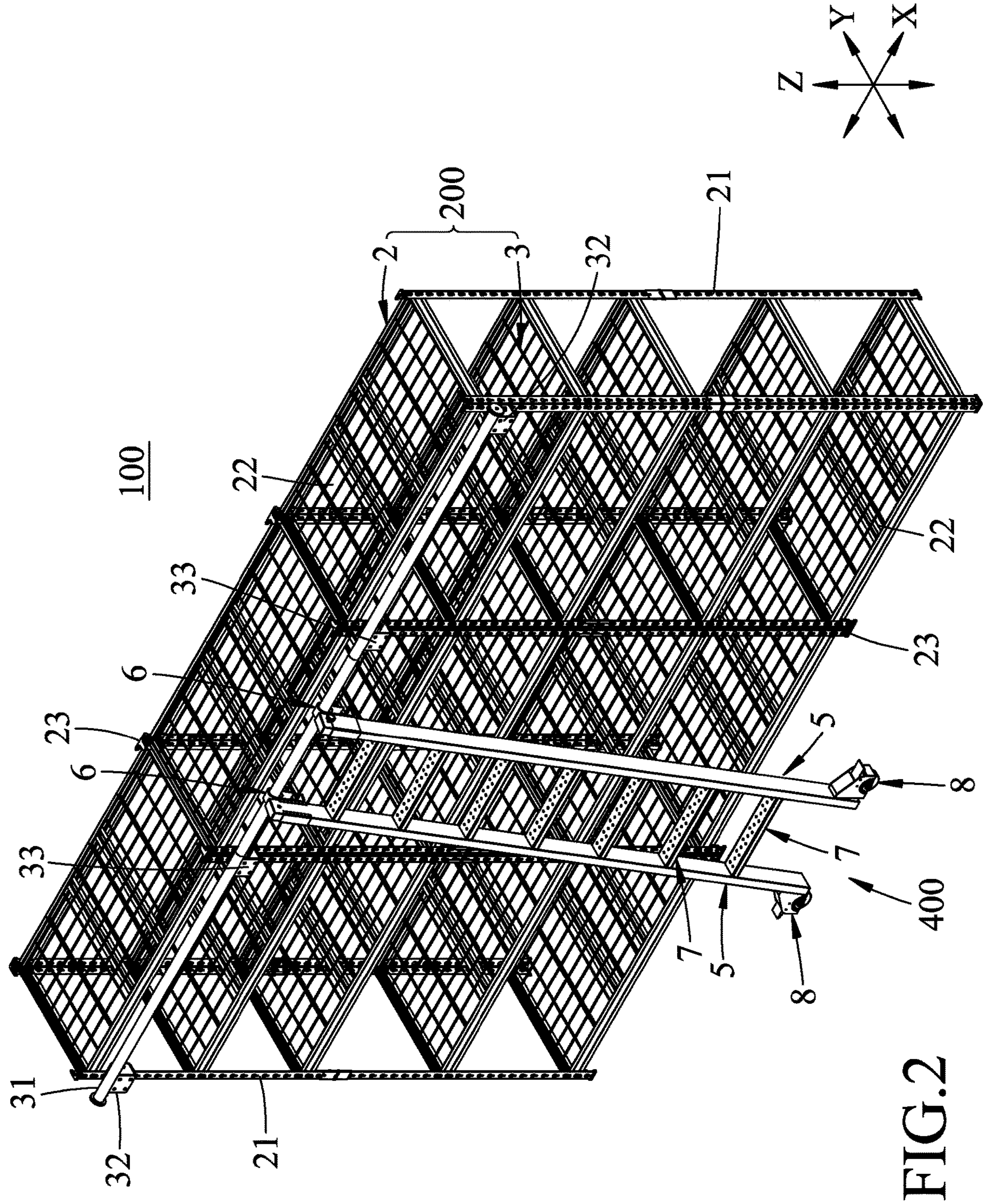
FIG. 2 is a perspective view of a shelf and ladder combination according to an embodiment of the present disclosure.
Figure 3:
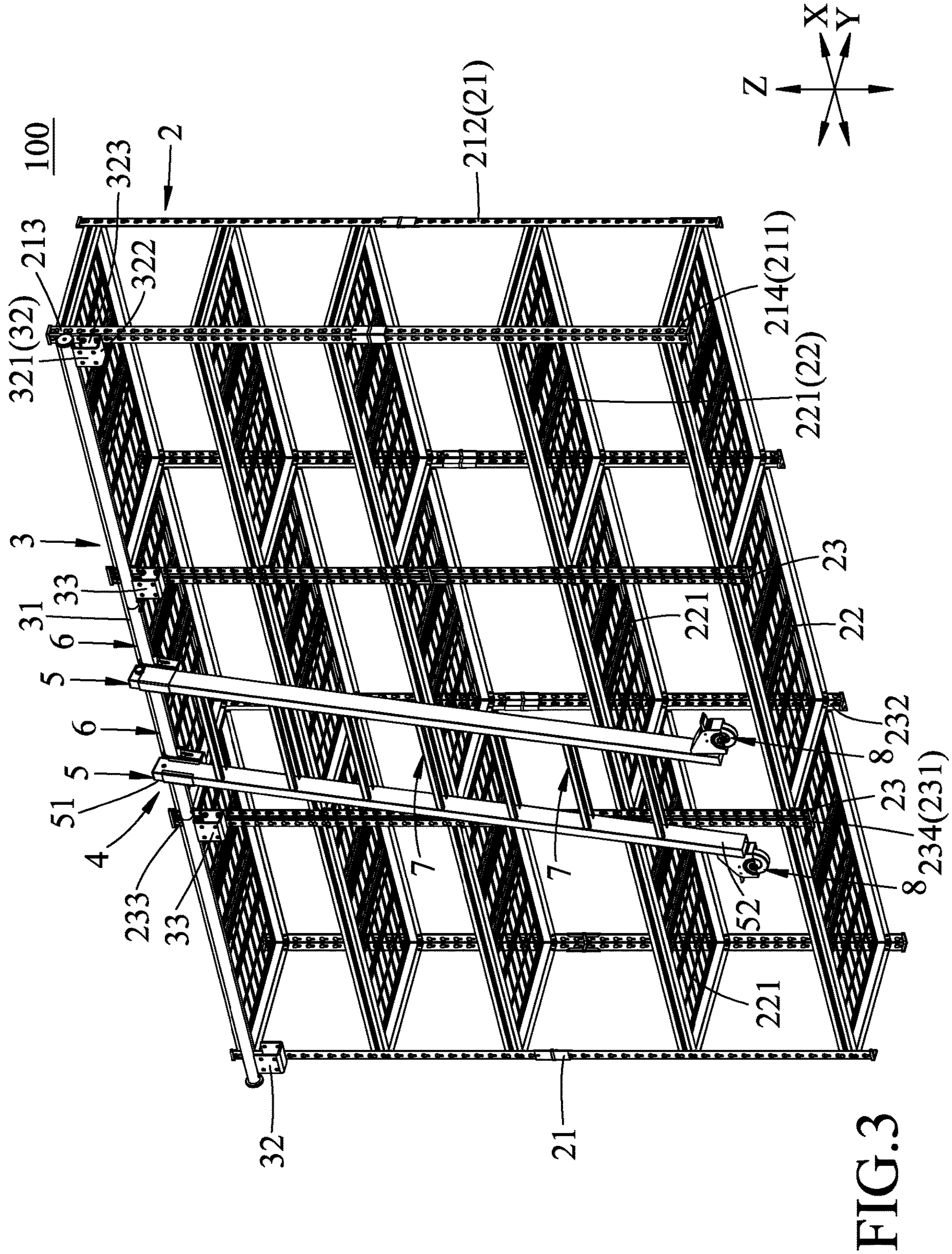
FIG. 3 is a view similar to FIG. 2, but taken from another angle.
Figure 4:
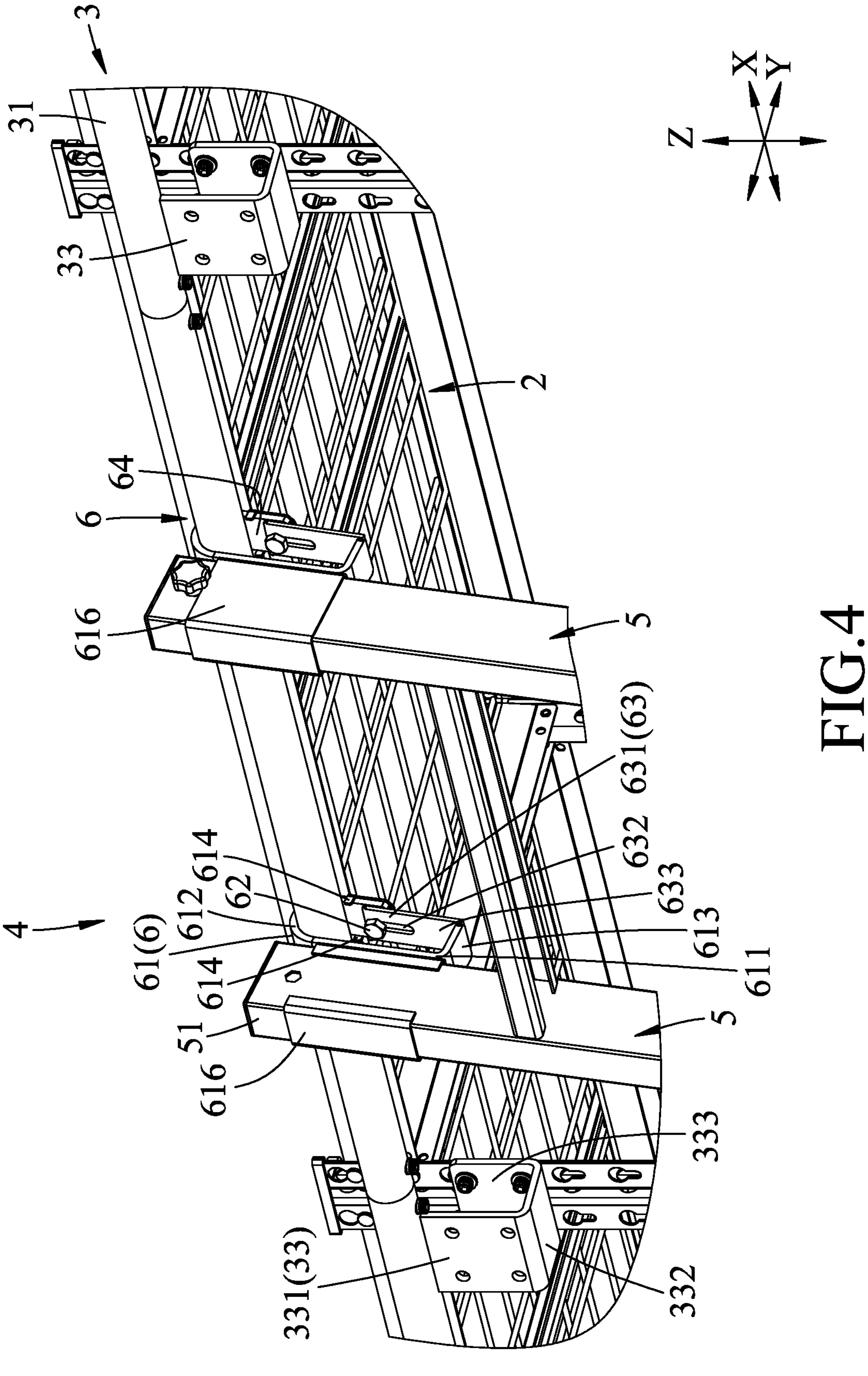
FIG. 4 is an enlarged fragmentary perspective view of the embodiment, illustrating switchable members of fixing units in a closed position.

Referring to FIGS. 2 to 4, a shelf and ladder combination 100 according to an embodiment of the present disclosure includes a shelf unit 200 and a ladder unit 400.

The shelf unit 200 includes a frame 2 and a positioning unit 3. The frame 2 includes two support rod units 21, a plurality of partition plates 22 and two reinforcement units 23. The support rod units 21 are spaced apart from each other in a second direction (X) transverse to the first direction (Z). Each support rod unit 21 extends in a first direction (Z), and has a top end portion 213 and a bottom end portion 214 opposite to each other in the first direction (Z). In this embodiment, each support rod unit 21 includes a first support rod 211 and a second support rod 212 extending in the first direction (Z) and spaced apart from each other in a third direction (Y) transverse to the first and second directions (Z, X). The first support rod 211 of each support rod unit 21 has the top and bottom end portions 213, 214 of a corresponding one of the support rod units 21. In this embodiment, the first direction (Z) is a top-bottom direction, the second direction (X) is a left-right direction, and the third direction (Y) is a front-rear direction.

The partition plates 22 are spaced apart from each other in the first direction (Z), are connected between the support rod units 21, and are suitable for placement of objects (not shown) thereon. Each partition plate extends in the second direction (X). In this embodiment, each partition plate 22 includes three partition sections 221 successively arranged along the second direction (X).

The reinforcement units 23 are spaced apart from each other in the second direction (X), are disposed between the support rod units 21 and are connected to the partition plates 22. Each reinforcement unit 23 has a connection end portion 233 and a support end portion 234 opposite to each other in the first direction (Z). In this embodiment, each reinforcement unit 23 includes a first reinforcement rod 231 and a second reinforcement rod 232 extending in the first direction (Z) and spaced apart from each other in the third direction (Y). The first reinforcement rod 231 of each reinforcement unit 23 has the connection end portion 233 and the support end portion 234 of a corresponding one of the reinforcement units 23.

The positioning unit 3 includes a crossbar 31, two main connecting brackets 32 and two auxiliary connecting bracket 33. The crossbar 31 extends in the second direction (X), is spaced apart from the frame 2 in the third direction (Y), and is proximate to the top end portions 213 of the support rod units 21 and the connection end portions 233 of the first reinforcement rods 231 of the reinforcement units 23.

Each main connecting bracket 32 is connected between the crossbar 31 and the top end portion 213 of the corresponding support rod unit 21, and has a main extension arm 321 extending downwardly from the crossbar 31 in the first direction (Z) toward the bottom end portion 214 of the corresponding support rod unit 21, a main bight portion 322 extending from one end of the main extension arm 321, which is distal to the crossbar 31, in the third direction (Y) toward the corresponding support rod unit 21, and a main fixed arm 323 connected between one end of the main bight portion 322, which is opposite to the main extension arm 321, and the corresponding support rod unit 21.

Each auxiliary connecting bracket 33 is connected between the crossbar 31 and a corresponding one of the reinforcement units 23, and has an auxiliary extension arm 331 extending downwardly from the crossbar 31 in the first direction (Z) toward the support end portion 234 of the corresponding reinforcement unit 23, an auxiliary bight portion 332 extending from one end of the auxiliary extension arm 331, which is opposite to the crossbar 31, in the third direction (Y) toward the corresponding reinforcement unit (23), and an auxiliary fixed arm 333 connected between one end of the bight portion 322, which is opposite to the auxiliary extension arm 331, and the corresponding reinforcement unit 23.

The ladder unit 400 includes two ladder legs 5, two fixing units 6, a plurality of rungs 7 and two positioning casters 8. The ladder legs 5 extend in the first direction (Z) and are spaced apart from each other in the second direction (X). Each ladder leg 5 has a first end portion 51 adjacent to the crossbar 31, and a second end portion 52 opposite to the first end portion 51 in the first direction (Z).

Each fixing unit 6 is connected to the first end portion 51 of a respective one of the ladder legs 5, is sleeved on the crossbar 31 and is slidable along the crossbar 31 in the second direction (X). Each fixing unit 6 includes a base member 61, a pivot pin 62, and a switchable member 63.

Figure 5:
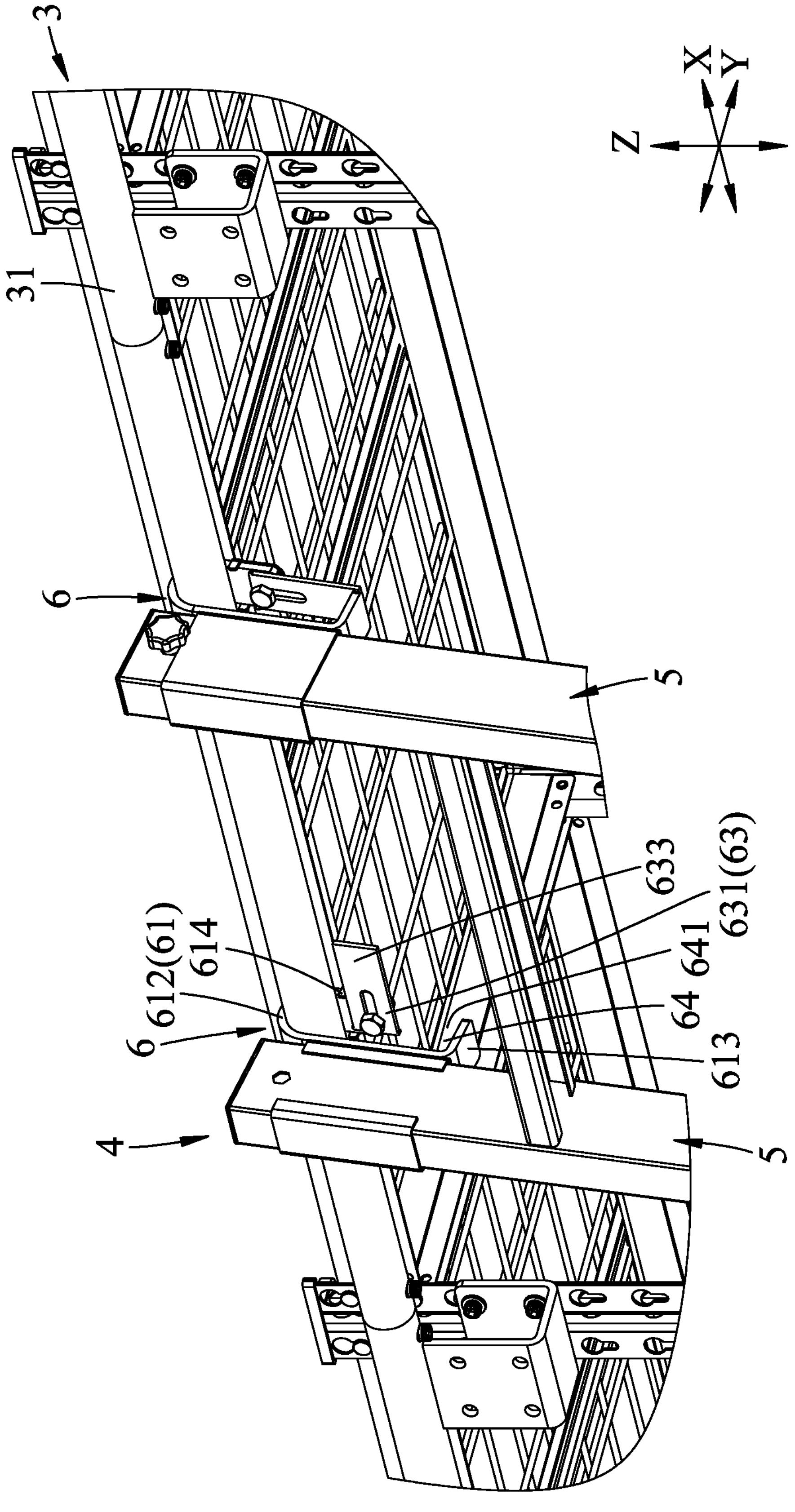
FIG. 5 is a view similar to FIG. 4, but illustrating one of the switchable members in an open position.

As shown in FIGS. 3 to 5, the base member 61 of each fixing unit 6 further has a main portion 611 connected to the first end portion 51 of the respective ladder leg 5, a connecting portion 612 extending upwardly and curvedly from one end of the main portion 611 and partially surrounding the crossbar 31, and an extension portion 613 extending transversely from the other end of the main portion 611 in a direction away from the first end portion 51 of the respective ladder leg 5 and opposite to the connecting portion 612. The main portion 611, the connecting portion 612 and the extension portion 613 cooperatively define an insertion space 64 for insertion of the crossbar 31 therethrough. The insertion space 64 has an opening 641 located between a bottom edge of the connecting portion 612 and an outer edge of the extension portion 613 which is distal to the main portion 611. The opening 641 permits passage of a corresponding one of each of the main and auxiliary connecting brackets 32, 33 therethrough.

In this embodiment, the base member 61 of each fixing unit 6 further has a sleeve portion 616 connected to the main portion 611 and sleeved on the first end portion of the respective ladder leg 5. The connecting portion 612 has two stoppers 614 protruding from two opposite lateral edges thereof toward the main portion 611.

The pivot pin 62 connects the switchable member 63 to an inner surface of the connecting portion 612 and is located below and between the stoppers 614. In this embodiment, the pivot pin 62 is located within the insertion space 64. The switchable member 63 has a pivot end portion 631 pivotally connected to the inner surface of the connecting portion 612 through the pivot pin 62, a pivot hole 632 formed in the pivot end portion 631 for extension of the pivot pin 62 therethrough, and a free end portion 633 opposite to the pivot end portion 631. The switchable member 63 is rotatable relative to the connecting portion 612 about the pivot pin 62 between a closed position and an open position. In the closed position, as shown in FIG. 4, the switchable member 63 closes the opening 641, and the free end portion 633 thereof is immediately adjacent to the extension portion 613. In the open position, as shown in FIG. 5, the free end portion 633 of the switchable member 63 is distal to the extension portion 613, and the opening 641 is opened. A pivoting angle of the switchable member 63 from the closed position to the open position relative to the connecting portion 612 is not greater than 90 degrees. When the switchable member 63 is pivoted to the open position, the switchable member 63 abuts against a corresponding one of the stoppers 614, and is prevented from further rotation relative to the connecting portion 612.

The rungs 7 are connected between the ladder legs 5 and are spaced apart from each other in the first direction (Z).

The positioning casters 8 are respectively connected to the second end portions 52 of the ladder legs 5.

During assembly of the shelf unit 200 and the ladder unit 400, the base members 61 of the fixing units 6 connected to the ladder legs 5 of the ladder unit 400 are sleeved on the right end of the crossbar 31 one after the other with the crossbar 31 extending through the insertion spaces 64 of the base members 61. As the switchable member 63 of the fixing unit 6 connected to a left ladder leg 5 contacts the main bight portion 322 of the main connecting bracket 32 on the right end of the crossbar 31, the switchable member 63 is pushed by the main bight portion 322 to pivot upward relative to the connecting portion 612, so that the main connecting bracket 23 can pass through the insertion space 64, and the base member 61 can slide leftward along the crossbar 31. The same is true for the switchable member 63 of the fixing unit 6 connected to a right ladder leg 5. After the base members 61 of the fixing units 6 connected to the left and right ladder legs 5 are sleeved on the crossbar 31, the fixing units 6 together with the ladder unit 400 can slide leftward and rightward along the crossbar 31.

It should be noted herein that the base members 61 of the fixing units 6 may also be sleeved on the left end of the crossbar 31 one after the other with the crossbar 31 extending through the insertion spaces 64 of the base members 61. The switchable members 63 of the fixing units 6 connected to the left and right ladder legs 5 may similarly be pushed by the main bight portion 322 of the main connecting bracket 32 on the left end of the crossbar 31 so as to pivot upward relative to the connecting portions 612, so that the main connecting bracket 23 may pass through the insertion space 64, and the fixing units 6 together with the ladder unit 400 may slide rightward and leftward along the crossbar 31.

After the ladder unit 400 is slid along the crossbar 31 to a predetermined position relative to the shelf unit 200, the positioning casters 8 are operated to position the ladder legs 5. The ladder unit 400 is now ready for use.

During the sliding movement of the ladder unit 400 along the crossbar 31, when the switchable member 63 of one of the fixing units 6 corresponds to one of the main and auxiliary connecting brackets 32, 33, the main bight portion 322 or the auxiliary bight portion 332 will push the switchable member 63 to pivot to the open position, so that the one of the main and auxiliary connecting brackets 32, 33 can pass through the insertion space 64 via the opening 641. Afterward, the switchable member 63 of the one of the fixing units 6 can pivot from the open position to the closed position by gravity.

Figure 6:
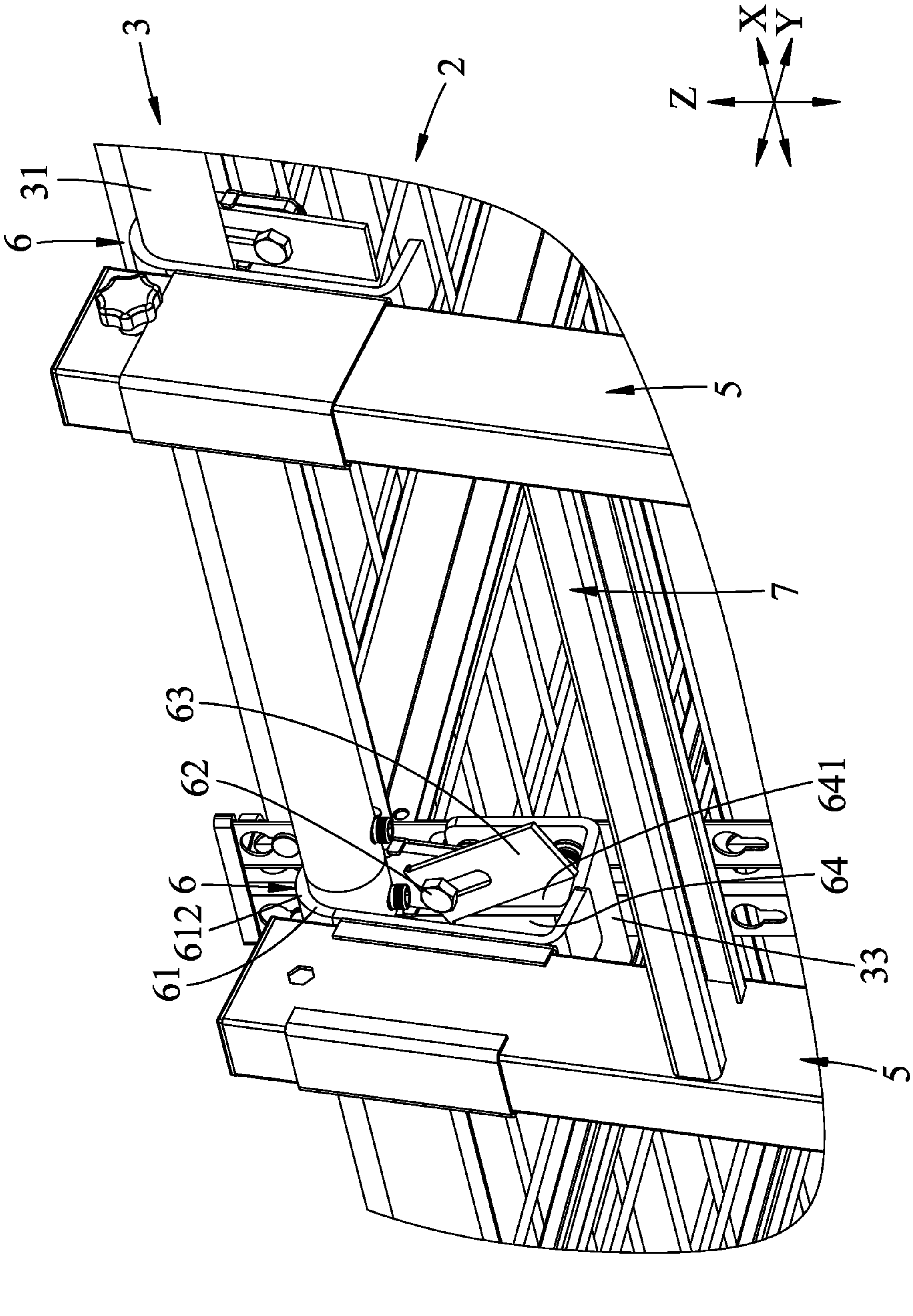
FIG. 6 is a view similar to FIG. 4, but illustrating the one of the switchable members being pushed by an auxiliary connecting bracket to pivot.

Referring to FIGS. 3 and 6, since the structure and the actuation principle of the fixing units 6 are the same, and since the structures of the main and auxiliary connecting brackets 32, 33 are the same, only the fixing unit 6 and the auxiliary connecting bracket 33 shown at a left side of FIG. 6 will be described hereinafter.

As shown in FIG. 6, when the fixing unit 6 is moved from a right side to the left side of the auxiliary connecting bracket 33, the auxiliary connecting bracket 33 first abuts a left side of the switchable member 63. Along with this right to left movement of the fixing unit 6, the switchable member 63 is pushed by the auxiliary bight portion 332 of the auxiliary connecting bracket 33 to pivot upward in a counterclockwise direction relative to the connecting portion 612 about the pivot pin 62 and to gradually open the opening 641 to allow passage of the auxiliary connecting bracket 33 therethrough. After the auxiliary connecting bracket 33 passes through the insertion space 64, the switchable member 63 will pivot downward in a clockwise direction relative to the connecting portion 612 to the closed position by gravity. Apart from being able to rotate upward in the counterclockwise direction relative to the connecting portion 612 of the base member 61, the switchable member 63 may also be pivoted upward in a clockwise direction relative to the connecting portion 612 so as to move from the left side to the right side of the auxiliary connecting bracket 33.

Thus, the ladder unit 400 can slide along the length of the crossbar 31 without being hindered by the auxiliary connecting brackets 33, and can be moved to the predetermined position. At this time, a user can climb up and down the rungs 7 of the ladder unit 400 to place or remove an object to or from one of the partition plates 22. Further, the ladder unit 400 can be removed from or sleeved on the crossbar 31 through the main connecting brackets 33, thereby enhancing convenience of use of this disclosure.

In addition, because the ladder unit 400 is connected to the crossbar 31, it does not occupy a substantial space, and can provide the user to stably move up and down the ladder unit 400.

It is worth to mention herein that, in this embodiment, the frame 2 includes two reinforcement units 23. However, in other embodiments, the frame 2 may include only one reinforcement unit 23 or more than three reinforcement units 23, or may not include the reinforcement unit 23, as long as the partition plates 22 are connected between the support rod units 21 to achieve the same effects.

Further, in this embodiment, the ladder unit 400 includes two fixing units 6. However, in other embodiments, the ladder unit 400 may include only one fixing unit 6 connected to the first end portion 51 of one of the ladder legs 5. The effects as described above may be similarly achieved Furthermore, in this embodiment, each fixing unit 6 has one switchable member 63. However, in other embodiments, each fixing unit 6 may not include the switchable member 63, as long as it can be sleeved on the crossbar 31 through the base member 61 to allow the ladder unit 400 to be slidably connected to the crossbar 31.

In summary, through the presence of the fixing units 6, the ladder unit 400 can be slidably connected to the crossbar 31 without being hindered by the auxiliary connecting brackets 33. Because the ladder unit 400 is connected to the crossbar 31, it does not occupy a substantial space, and can allow the user to stably move up and down the rungs 7 for placing or removing the object on or from one of the partition plates 22. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A shelf and ladder combination comprising:

a shelf unit including a frame including two support rod units each of which extends in a first direction, and a plurality of partition plates each of which extends in a second direction transverse to the first direction, said support rod units being spaced apart from each other in the second direction, each of said support rod units having a top end portion and a bottom end portion opposite to each other in the first direction, said partition plates being connected between said support rod units and being spaced apart from each other in the first direction, and a positioning unit including a crossbar that extends in the second direction, that is spaced apart from said frame in a third direction transverse to the first and second directions and that is proximate to said top end portions of said support rod units, and two main connecting brackets each of which is connected between said crossbar and said top end portion of a corresponding one of said support rod units; and a ladder unit including two ladder legs extending in the first direction and spaced apart from each other in the second direction, at least one fixing unit that is connected to one of said ladder legs, that is sleeved on said crossbar and that is slidable along said crossbar in the second direction, and a plurality of rungs connected between said ladder legs and spaced apart from each other in the first direction, each of said ladder legs having a first end portion adjacent to said crossbar, and a second end portion opposite to said first end portion in the first direction;

wherein said at least one fixing unit is connected to said first end portion of one of said ladder legs;

wherein said frame further includes at least one reinforcement unit that extends in the first direction, that is disposed between said support rod units and that is connected to said partition plates, said at least one reinforcement unit having a connection end portion and a support end portion opposite to each other in the first direction, said crossbar being proximate to said connection end portion, said positioning unit further including at least one auxiliary connecting bracket connected between said crossbar and said at least one reinforcement unit, said at least one auxiliary connecting bracket having an auxiliary extension arm extending downwardly from said crossbar in the first direction toward said support end portion, an auxiliary bight portion extending from one end of said auxiliary extension arm, which is opposite to said crossbar, in the third direction toward said at least one reinforcement unit, and an auxiliary fixed arm connected between one end of said bight portion, which is opposite to said auxiliary extension arm, and said at least one reinforcement unit;

wherein said at least one fixing unit includes a base member having a main portion connected to said first end portion of said one of said ladder legs, a connecting portion extending from one end of said main portion and partially surrounding said crossbar, and an extension portion extending transversely from the other end of said main portion in a direction away from said first end portion of said one of said ladder legs and opposite to said connecting portion, wherein said main portion, said connecting portion and said extension portion cooperatively define an insertion space for insertion of said crossbar therethrough, said insertion space having an opening located between a bottom edge of said connecting portion and an outer edge of said extension portion which is distal to said main portion, said opening permitting passage of a corresponding one of each of said main connecting brackets and said at least one auxiliary connecting bracket therethrough; and wherein said at least one fixing unit further includes a switchable member having a pivot end portion pivotally connected to said connecting portion, and a free end portion opposite to said pivot end portion, said switchable member being rotatable relative to said base member between a closed position, in which said switchable member closes said opening and said free end portion is immediately adjacent to said extension portion, and an open position, in which said free end portion is distal to said extension portion such that said opening is opened.

2. The shelf and ladder combination as claimed in claim 1, wherein said at least one fixing unit further includes a pivot pin connecting said switchable member to said connecting portion, and said switchable member further has a pivot hole formed in said pivot end portion for extension of said pivot pin therethrough.

3. The shelf and ladder combination as claimed in claim 2, wherein said connecting portion has two stoppers provided on two opposite lateral edges thereof, and said switchable member is abuttable against one of said stoppers to stop continuous rotation of said switchable member when pivoted to said open position.

4. The shelf and ladder combination as claimed in claim 1, wherein each of said main connecting brackets has a main extension arm extending downwardly from said crossbar in the first direction toward said bottom end portion of the corresponding one of said support rod units, a main bight portion extending from one end of said main extension arm, which is distal to said crossbar, in the third direction toward the corresponding one of said support rod units, and a main fixed arm connected between one end of said main bight portion, which is opposite to said main extension arm, and the corresponding one of said support rod units.

5. The shelf and ladder combination as claimed in claim 1, wherein each of said support rod units includes a first support rod and a second support rod extending in the first direction and spaced apart from each other in the third direction, said first support rod of each of said support rod units having said top and bottom end portions of the corresponding one of said support rod units, said at least one reinforcement unit including a first reinforcement rod and a second reinforcement rod extending in the first direction and spaced apart from each other in the third direction, said first reinforcement rod having said connection end portion and said support end portion of said at least one reinforcement unit.

6. The shelf and ladder combination as claimed in claim 1, wherein said ladder unit further includes two positioning casters respectively connected to said second end portions of said ladder legs.

* * * * *